B. R. VAN KIRK.
BRAKE MECHANISM FOR LOCOMOTIVES.
APPLICATION FILED FEB. 19, 1915.
1,174,913.
Patented Mar. 7, 1916.
2 SHEETS—SHEET 1.
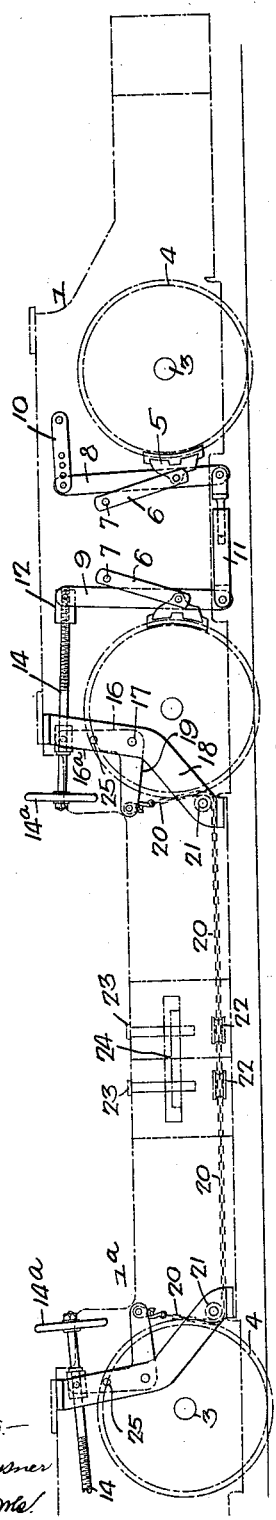
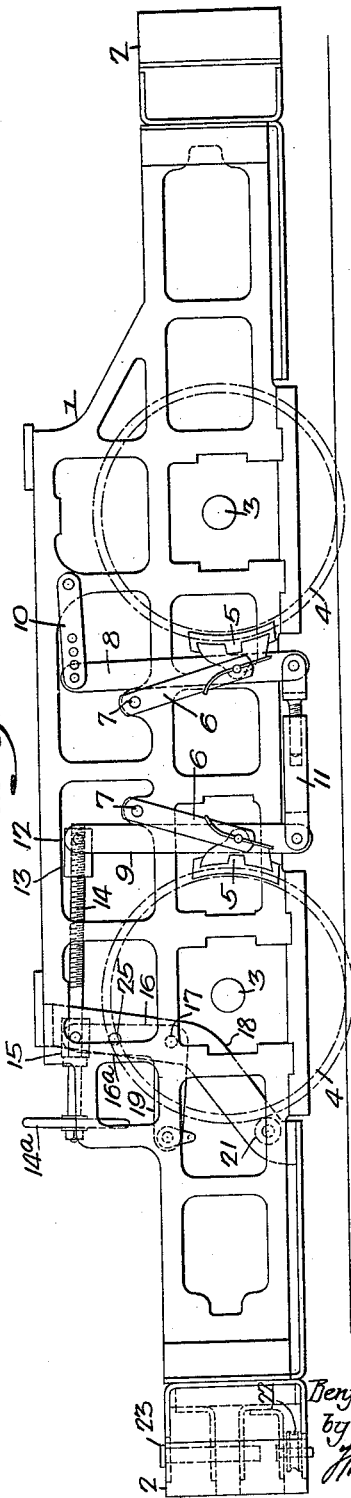
Inventor.—
Benjamin R. Van Kirk.
by his Attorneys—

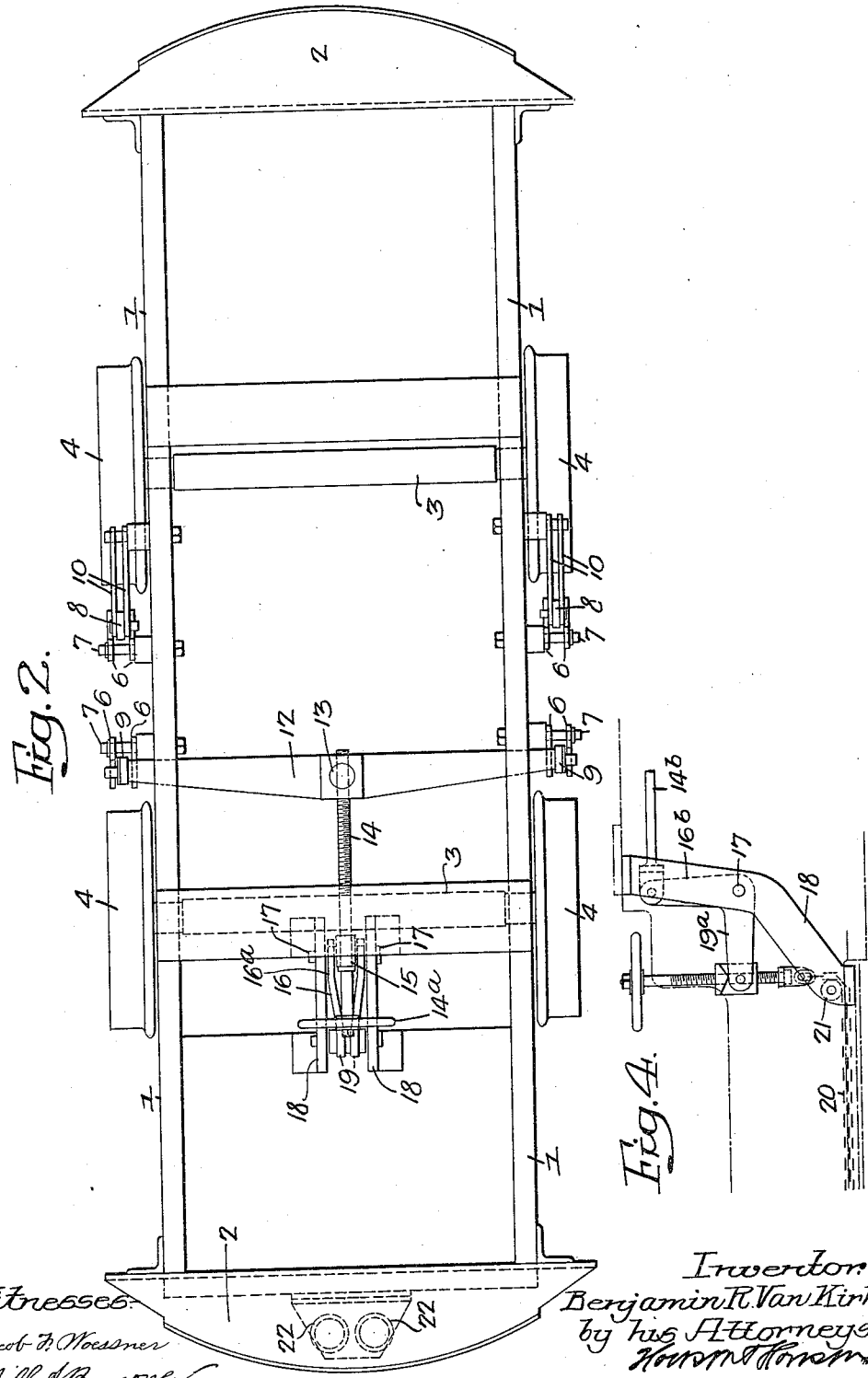

UNITED STATES PATENT OFFICE.

BENJAMIN R. VAN KIRK, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

BRAKE MECHANISM FOR LOCOMOTIVES.

1,174,913.  Specification of Letters Patent.  Patented Mar. 7, 1916.

Application filed February 19, 1915. Serial No. 9,333.

*To all whom it may concern:*

Be it known that I, BENJAMIN R. VAN KIRK, a citizen of the United States, residing in Philadelphia, Pennsylvania, have invented certain Improvements in Brake Mechanism for Locomotives, of which the following is a specification.

The object of my invention is to arrange the brake mechanism of a mine locomotive so that when two locomotives are coupled together the brake mechanism can also be coupled together in order that both brakes may be operated from a single point. This object I attain in the following manner, reference being had to the accompanying drawings, in which:

Figure 1 is a side view of sufficient of an electric mine locomotive to illustrate my invention; Fig. 2 is a skeleton plan view; Fig. 3 is a view showing two locomotives coupled together; and Fig. 4 is a view illustrating a modification of the invention.

1 is the frame of the electric mine locomotive of the usual type having beams 2.

3, 3 are the axles.

4, 4 are the wheels.

One or both of these axles is driven in the ordinary manner from the electric motor, which is not shown. It will be understood that in some instances instead of electricity other motive power may be used, such as air, or steam, without departing from the essential feature of the invention.

5, 5 are the brake shoes, which are applied to the wheels 4, and these brake shoes are carried by links 6 hung from the frame 1 at 7.

8 and 9 are the two levers of the brake mechanism, the lever 8 being connected by a link 10 to a fixed point on the frame and the two levers 8 and 9 are connected by an adjustable link 11 of the ordinary type. These levers are pivoted to the brake heads or beams, as shown. The upper ends of the arms 9 at each side of the locomotive are connected by a bar 12 and in the bar is a threaded opening or a nut 13 through which extends an operating screw spindle 14 mounted in a block 15 carried by one arm 16ª of a bell crank lever 16 pivoted at 17 to a frame 18. The other arm 19 of this lever extends toward one end of the frame and one end of a chain 20 is attached to this lever, as shown, and passes around a guide wheel 21 on the frame and between a pair of guide wheels 22 at the bumper 2. The space between these wheels is directly in line, in the present instance, with the opening for the coupling pin 23 and the frames 1 and 1ª of the two locomotives are coupled by the link 24. The chain extends from one arm 19 on one locomotive to an arm 19 on the other locomotive and the chain guide wheels are so located that when the locomotives pass around curves there will be no longitudinal movement of the chain. The chain can be detached from the arms 19, when desired, or two chains may be used, connected by a suitable coupling at the bumpers.

On the end of the operating screw 14 is a hand wheel 14ª and the operating mechanism of each locomotive is identical in construction. When the locomotive is operating as a single locomotive then the bell crank lever 16 is secured to the frame 18 by a pin 25, which is passed through an opening in the frame and the lever, so that when the hand wheel 14ª is turned the screw will move the cross bar 12 of the brake mechanism toward and from the block 15 and will apply or release the brakes. When the two locomotives are coupled together, as in Fig. 3, then the pin 25 of both locomotives is removed so that, when either of the operating screws 14 is turned, motion will be imparted to the other operating screw through the medium of the bell crank levers 16 and the chain 20. The other operating screw is used as a connecting rod to couple the lever to its brake lever 9. By this construction any lost motion of one part is taken up by the mechanism of the other part. When it is wished to detach the locomotive, all that is necessary is to detach the chain, or chains, and to withdraw one of the pivot pins and to lock the bell crank lever 16 of the locomotive to be used by the pin 25 on each lever, after which the brake mechanism of the lever can be used in the ordinary manner.

In Fig. 4, I have illustrated a modification in which the chain is connected directly with the operating screw on the arm 19ª and the arm 16ᵇ of the bell crank lever is connected by a rod 14ᵇ to the operating mechanism, accomplishing the same purpose as the construction illustrated in Fig. 1.

I claim:

1. The combination of a frame; brake mechanism suspended therefrom; a bell crank lever; an operating screw carried by the lever for actuating the brake mechanism; a second frame having brake mechanism and a bell crank lever; an operating screw carried by the said lever for actuating the brake mechanism; a detachable, flexible connecting means extending from the lever on one frame to the lever on the other frame; and guides for the said connecting means.

2. The combination of a frame; brake mechanism suspended therefrom; a bell crank lever; an operating screw carried by one arm of the lever and engaging the brake mechanism; a second frame; a bell crank lever thereon having an arm connected to the brake operating mechanism of said second frame; and a chain connecting the other two levers of the bell crank mechanisms so that when motion is imparted to one operating screw the brakes are either applied or released in unison on both locomotives.

In testimony whereof, I have signed my name to this specification, in the presence of two subscribing witnesses.

BENJAMIN R. VAN KIRK.

Witnesses:
Wm. E. Shupe,
Wm. A. Barr.

Copies of this patent may be obtained for five cents each, by addressing the "Commissioner of Patents, Washington, D. C."